No. 642,001. Patented Jan. 23, 1900.
V. REHM.
BICYCLE BRAKE.
(Application filed June 27, 1899.)

(No Model.) 2 Sheets—Sheet 1.

Witnesses:
A. Schmitz
Jos. Frey

Inventor
Victor Rehm
per O. Klein
Attorney

THE NORRIS PETERS CO., PHOTO-LITHO., WASHINGTON, D. C.

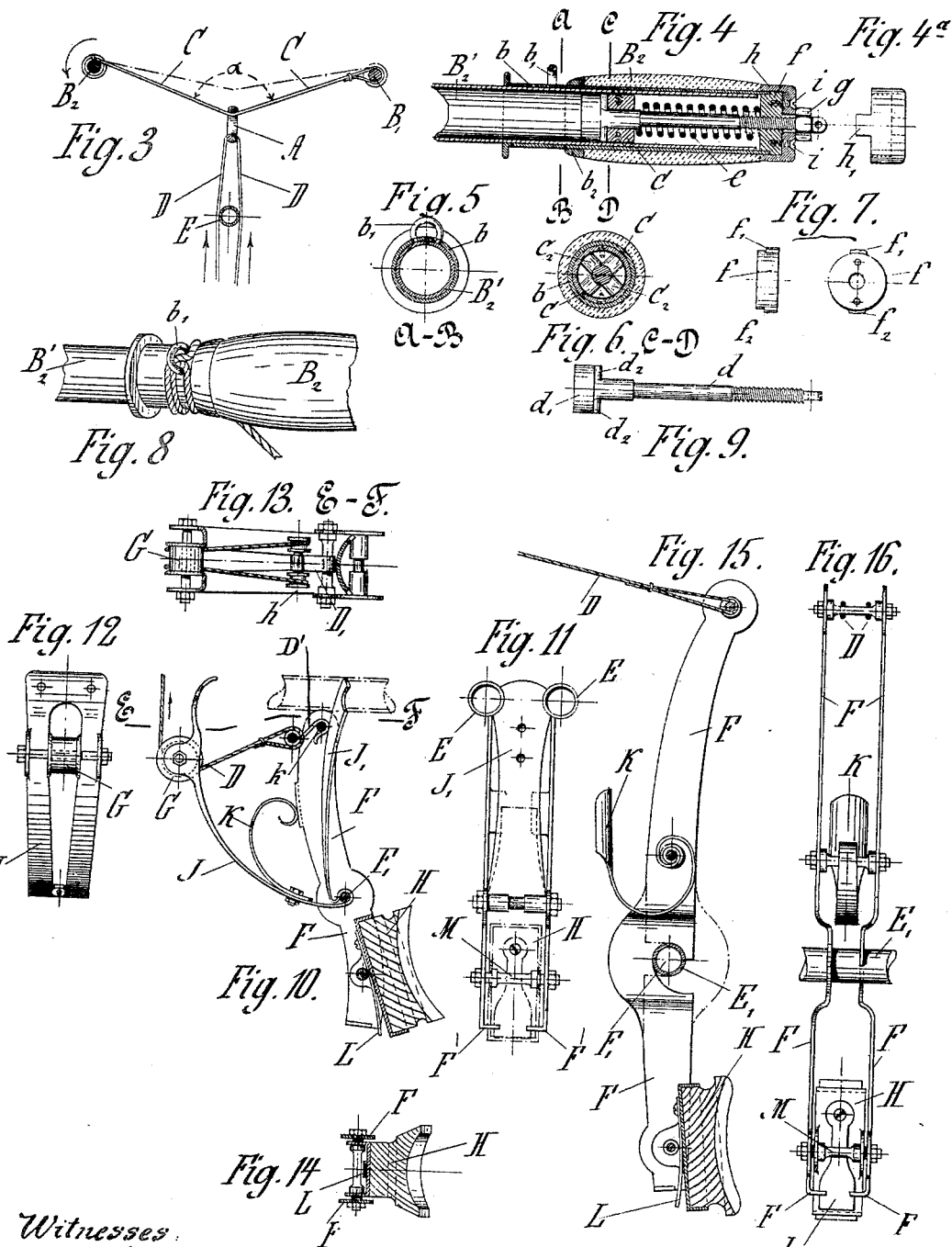

UNITED STATES PATENT OFFICE.

VICTOR REHM, OF BADEN-BADEN, GERMANY.

BICYCLE-BRAKE.

SPECIFICATION forming part of Letters Patent No. 642,001, dated January 23, 1900.

Application filed June 27, 1899. Serial No. 722,028. (No model.)

*To all whom it may concern:*

Be it known that I, VICTOR REHM, a private gentleman and a citizen of the German Empire, residing at Baden-Baden, Grand Duchy of Baden, Germany, have invented a new and useful Arrangement for Velocipedes, of which I give the following description.

My invention refers to a brake attachment for velocipedes by which the wheelman will be able to apply the brake on sloping roads without having to alight from his wheel, the object of my invention being to provide a brake for the hind wheel operated independently of the usual brake on the head-post, which I retain in my construction. To this end I provide a brake-lever pivoted near the hind wheel and connected through a suitable operating medium with one of the handle-bars, which is arranged to be rotated by the hand of the rider.

Other features will be described and ascertained in the course of the following specification and by reference to the drawings accompanying and forming a part thereof, whereon—

Figure 1:
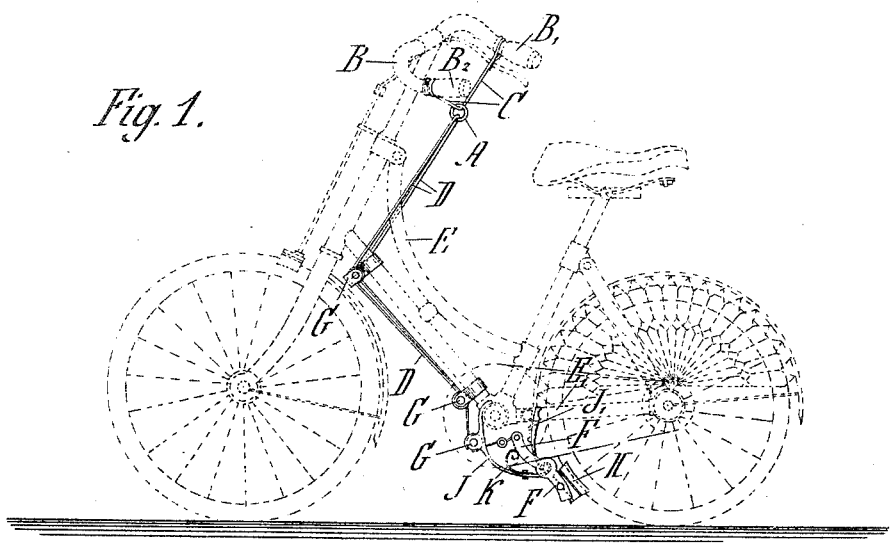
Figure 2:
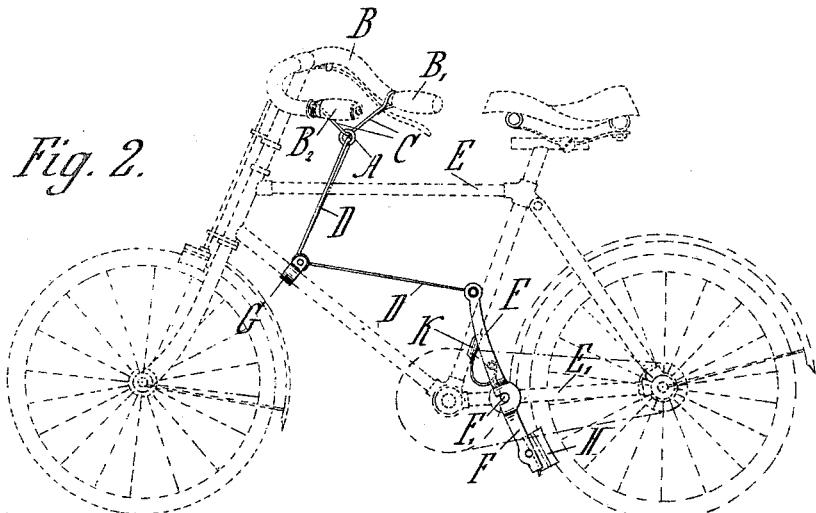

Figure 1 represents a general view of a brake constructed in accordance with my invention adapted to a lady's wheel. Fig. 2 is a similar view showing the brake attached to a gentleman's wheel. Fig. 3 is a detail of the operating-cord. Figs. 4 to 9 illustrate details of the revoluble handle-bar. Figs. 10 to 16 are details of the braking-lever and shoe.

Like letters of reference denote like parts in the several views.

Referring to the drawings, Fig. 3 represents a cord C, a little slack downward, passed through a ring A, the sides of the cord forming the angle $a$ and being fastened to the hind ends of the two handles $B'$ $B^2$ of the guide-bar. The slackness of the cord can be lessened by a turn of the left handle $B^2$, whereby the cord is wound on a socket $b$, which is provided with a rim. Hereby the angle $a$ becomes larger, the ring A is lifted, and another cord D, which passes through ring A, is pulled taut, this cord leading on both sides of the upper part of the frame E over pulleys to a brake-lever F, by means of which the brake is applied, as will be presently described.

Annular ring $c$, which is provided with a central bore and two notches $c'$ and $c^2$, rectangular to one another, is screwed fast within the tube $B\frac{1}{2}$ of the guide-bar B at a suitable distance from the end of the same. The head $d'$ of a pin $d$ rests behind these notches in position to engage the same, as will be presently described. The head $d'$ of this pin (see Figs. 7 and 9) is provided with two noses or wove-like projections $d^2$ and $d^2$, arranged radial and opposite to one another and corresponding to the notches $c'$ and $c^2$, which at each quarter-turn of the pin place themselves into the corresponding notches $c'$ and $c^2$.

The spiral spring $e$, pushed over the pin $d$ and resting on the immovable part $c$, can be made more or less tense by an intermediate piece $f$, (see also Fig. 7,) which is provided with a thread, and by means of two small noses $f'$ and $f^2$ on its outer cylindrical rim can be arrested by corresponding notches of the socket $b$. The spring $e$ having been made tense and the intermediate piece $f$ having been arrested in $b$, I push over the tube $B\frac{1}{2}$ of the guide-bar, the metallic socket $b$, over which I push the handle, made of horn or the like $B^2$, $B^2$ always meaning the left handle, on which the ear $b'$ and the ring $b^2$ have been soldered, and if we put before them the cap $h$, which, serving as washer for the nut $g$, is screwed on the intermediate piece $f$ by the little screws $i$ $i$ and is connected with $B^2$ by the nose $h'$, Fig. 4, and we may pronounce this arrangement of the handle as perfect.

By turning the handle in any direction and especially by drawing tight the nut $g$, which, with regard to disk $f$, at the same time is a check-nut, the pin, and with it the noses $d^2$ and $d^2$, are pulled out of the notches $c'$ and $c^2$ of the part $c$, whereby the spring $e$, already tense, is made still more tense, the noses at once— *i. e.*, after a quarter-turn of the handle—falling again into the notches. If we now suppose that, as shown in Fig. 8, a cord C is wound on the socket $b$ and secured to the same by the ear $b'$ and that D is a cord which leads to the brake and by a pull makes it act on the wheel, it is easily understood that by turning the left handle outward—*i. e.*, seen from above from the right to the left—the slack cord C is shortened and the cord D is drawn taut by means of the ring A, which also serves to adjust the different lengths of the cords on turning corners, whereby the brake is made to act on the wheel.

Of great importance for the wheelman is the fact that he need not at all hold the left handle fast during the time he wants to apply the brake, as by means of the tense spring $e$ the noses $d^2$ $d^2$ of the pin $d$ hold fast in the notches $c'$ and $c^2$. Thus the handle $B^2$ can only be turned with some effort by jerks, a jerk taking place every quarter-turn.

In Figs. 10 to 16 F represents a lever movable in the pivot F'. The cord D, which is led over the pulleys G G, is secured to one arm of this lever and a brake-block H H to the other arm. By pulling the cord D the brake-block is pressed on the tire, and thus the speed of the wheel is checked.

As to the gentlemen's wheels a cross-connection tube E' of the frame, which usually serves to fasten the mud-guard for the hind wheel, may be directly used as a pivot for the lever F. As to ladies' wheels the screws and screw-holes which usually serve to fasten the mud-guards for the hind wheel and the chain may be made use of.

Added to the frame of the lady's wheel is a part J, which, if properly made according to what has been said, may at once be screwed on any velocipede.

The gentleman's wheel in the drawings is an "Adler" velocipede. On ladies' wheels the cord D by means of a hook D', which unites the two parallel cords, is simply hooked on the bolt $k$, which holds the side pieces of the lever together. In order to fasten J better, part J' is secured between the forked parts of the frame, which at this spot are parallel, as shown in Figs. 10 and 11.

On both kinds of wheels a spring K acts on the lever F in such manner as to hold the brake-block distant from the tire when the cord C is slack. A spring L holds the brake-block, which otherwise would swing more or less about the pin M, to which it is pivoted in its proper position, thus preventing the block from touching the wheel when cord C is slack and pressing the block equally on the tire when the brake is applied. Two flanges F' F', formed by bending inward the ends of the side pieces of the lever, limit the deflection of the springs L L.

In order to facilitate the fastening of the lever to and the removal of the same from the gentleman's wheel, the hind and lateral front pieces of the lever F near the pivot are of different shape, the solid lines denoting the former and the dotted lines denoting the latter.

What I claim as new, and desire to secure by Letters Patent, is an arrangement for a brake for the hind wheel of velocipedes, its characteristic features being—

1. A bicycle having the grip on one of its handle-bars made to rotate, a loose cord connecting said rotatable grip with the opposite handle-bar, a ring slidable on said cord, another cord led through said ring down to and operatively connected with a brake mechanism comprising a spring-pressed lever pivoted near the hind wheel and carrying a brake-shoe, whereby when said grip is turned the brake is applied, substantially as set forth.

2. The combination in a bicycle of a handle-bar provided with a rotatable grip having a flange and a ring, said grip, a loose cord fastened to said ring and looped over the opposite handle-bar, a ring slidable on said cord, a stationary support, a downwardly-extended lever fulcrumed upon said support, a brake-shoe pivoted to its lower arm, a spring normally holding said brake-shoe out of contact with the wheel, and a cord operatively connecting the upper arm of said lever with said slidable ring, whereby when the grip is turned the brake will be applied, substantially as described.

In witness whereof I have hereunto set my hand in presence of two witnesses.

VICTOR REHM.

Witnesses:
JACOB ADRIAN,
HENRY KUHN.